United States Patent
Rebello et al.

(10) Patent No.: US 12,454,679 B2
(45) Date of Patent: Oct. 28, 2025

(54) NON-DECELLULARIZED PLANT LEAF CULTURES FOR MEAT

(71) Applicant: Worcester Polytechnic Institute, Worcester, MA (US)

(72) Inventors: Alex S. Rebello, Somerset, MA (US); Jordan Jones, Allston, MA (US); Glenn Gaudette, Holden, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 192 days.

(21) Appl. No.: 17/317,037

(22) Filed: May 11, 2021

(65) Prior Publication Data

US 2021/0348129 A1 Nov. 11, 2021

Related U.S. Application Data

(60) Provisional application No. 63/022,758, filed on May 11, 2020.

(51) Int. Cl.
| | | |
|---|---|---|
| *C12N 5/077* | (2010.01) | |
| *A23L 13/00* | (2016.01) | |
| *A23L 19/00* | (2016.01) | |
| *A23L 33/105* | (2016.01) | |

(52) U.S. Cl.
CPC ............ *C12N 5/0659* (2013.01); *A23L 13/00* (2016.08); *A23L 19/03* (2016.08); *A23L 33/105* (2016.08); *A23V 2002/00* (2013.01); *C12N 2513/00* (2013.01); *C12N 2533/90* (2013.01)

(58) Field of Classification Search
CPC .............. C12N 5/0659; C12N 2513/00; C12N 2533/90; A23L 13/00; A23L 19/03; A23L 33/105; A23L 19/00; A23L 19/03; A23V 2002/00
See application file for complete search history.

(56) References Cited

U.S. PATENT DOCUMENTS

| | | | |
|---|---|---|---|
| 2011/0174451 A1 | 7/2011 | Dietz | |
| 2019/0060520 A1 | 2/2019 | Pelling et al. | |
| 2022/0007696 A1* | 1/2022 | Lavon | C12N 5/0605 |
| 2022/0295841 A1* | 9/2022 | Moore | C12N 5/0068 |

FOREIGN PATENT DOCUMENTS

| | | |
|---|---|---|
| WO | 2017160862 A1 | 9/2017 |
| WO | 2018227016 A1 | 12/2018 |

OTHER PUBLICATIONS

Hirst, A. "Design Shows Take On the Future. And It's Not Pretty." The New York Times, Jan. 21, 2020. (Year: 2020).*
Fontana et al. "Biofunctionalized plants as diverse biomaterials for human cell culture." Adv Healthc Mater. Apr. 2017; 6(8) (Year: 2017).*
Buettner et al. "A model of neurite extension across regions of nonpermissive substrate: simulations based on experimental measurement of growth cone motility and filopodial dynamics" Dev Biol. Jun. 1994;163(2):407-22. (Year: 1994).*
Langen et al. "Enhanced myogenic differentiation by extracellular matrix is regulated at the early stages of myogenesis." In Vitro Cell Dev Biol Anim.Mar.-Apr. 2003;39(3-4):163-9. (Year: 2003).*
"Biomedically Engineered Spinach Transforms Lab-Grown Meat." https://www.mathworks.com/company/mathworks-stories/biomedically-engineered-spinach-transforms-lab-grown-meat.html. MATLAB & Simulink. Acessed on Jun. 27, 2024. (Year: 2017).*
Gershlak et al. "Crossing kingdoms: Using decellularized plants as perfusable tissue engineering scaffolds." Biomaterials 125 (2017): 13-22. (Year: 2017).*
Alkhaledi, et al, "Leefy Jerkey TM: A Sustainable Meat Product for a Better Future" Worcester Polytechnic Institute, Apr. 25, 2019, p. 1-105.
International Search Report, PCT/US2021/031701, Aug. 17, 2021, pp. 1-2.

* cited by examiner

*Primary Examiner* — Titilayo Moloye
(74) *Attorney, Agent, or Firm* — Armis IP Law, LLC

(57) ABSTRACT

An in vitro meat having non-decellularized leaf scaffold and a method for producing an in vitro meat using non-decellularized leaf scaffold are described herein. The method includes preparing a non-decellularized plant leaf and incubating the leaf in a cell culture media to obtain a non-decellularized leaf scaffold; seeding the leaf scaffold with a population of muscle cells to obtain a leaf scaffold adhered population of muscle cells; and growing the leaf scaffold adhered population of muscle cells in cell culture media thereby obtaining the in vitro meat.

11 Claims, 14 Drawing Sheets

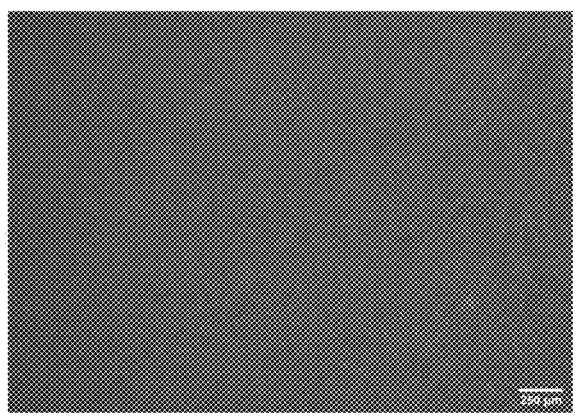
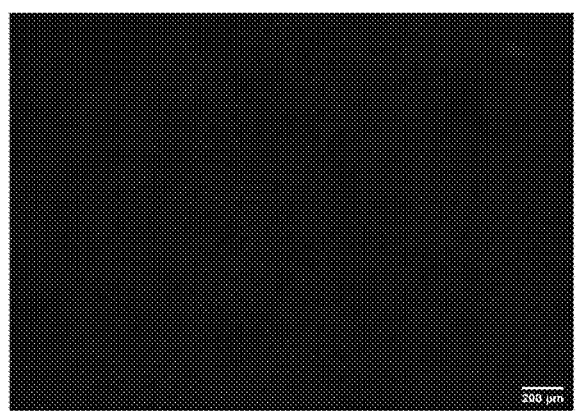
Fig. 2A                                  Fig. 2B

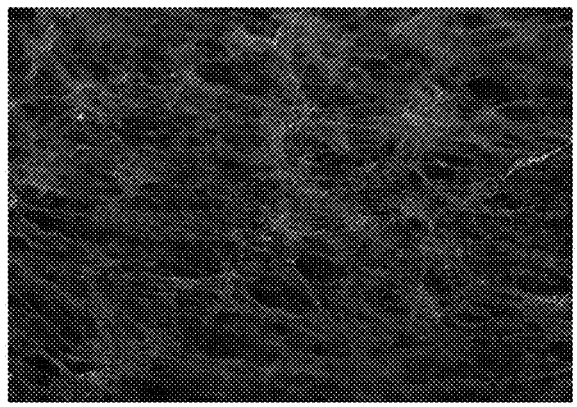
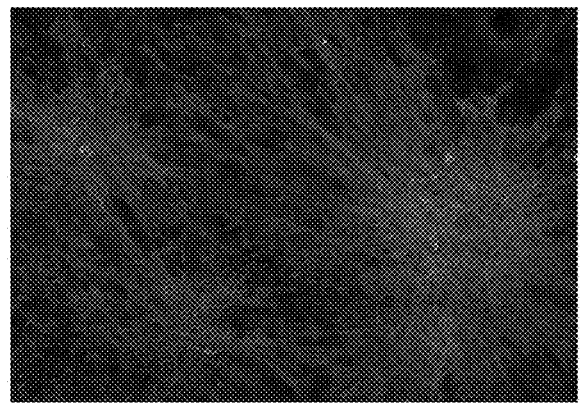
Fig. 3A                                                  Fig. 3B
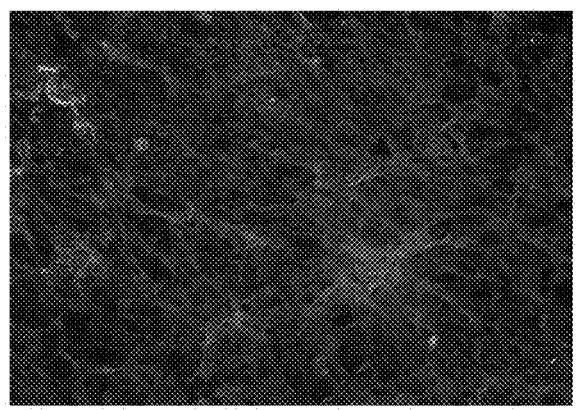
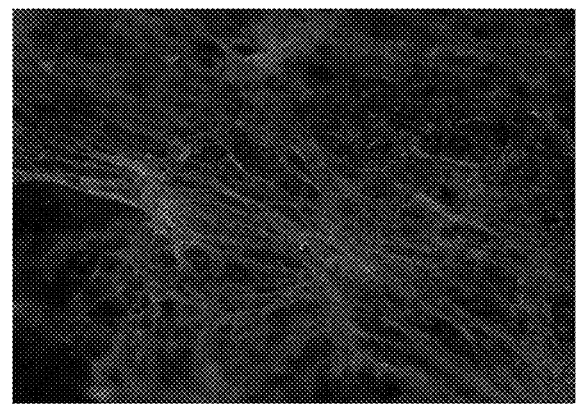
Fig. 3C                                                  Fig. 3D

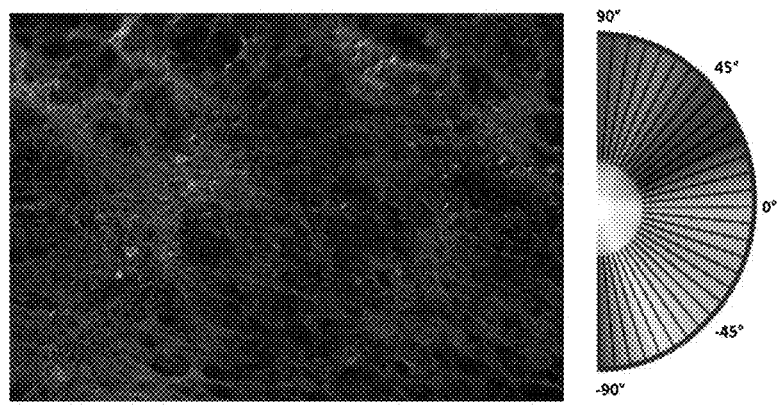
Fig. 3E
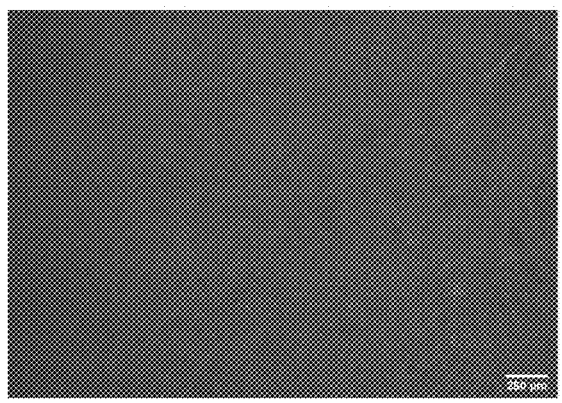 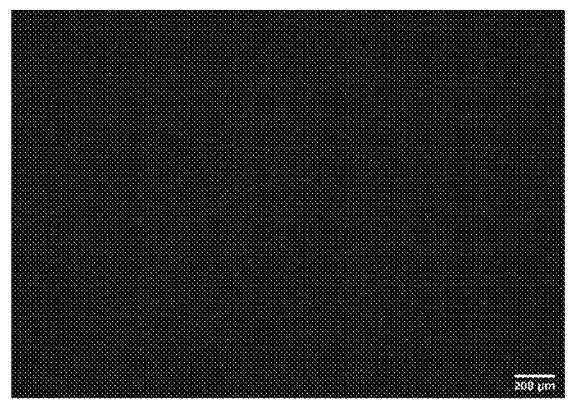
Fig. 4A                    Fig. 4B

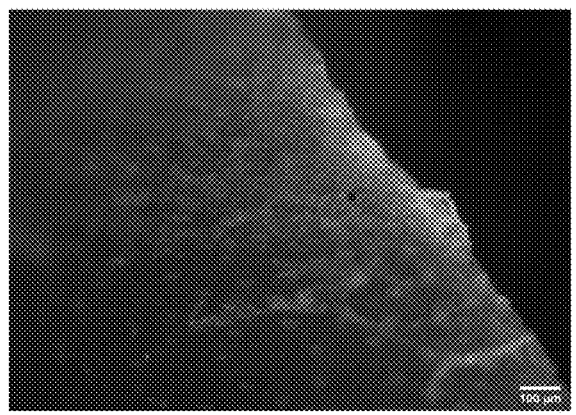
Fig. 4G
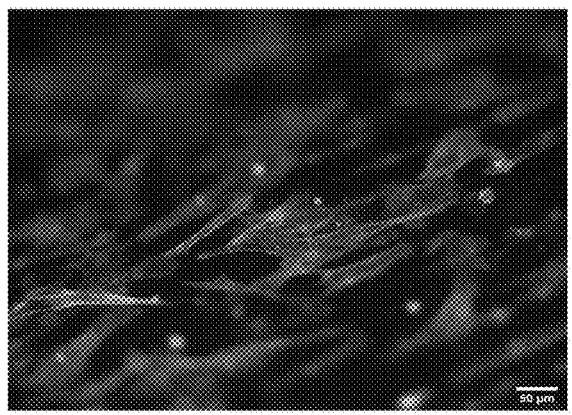 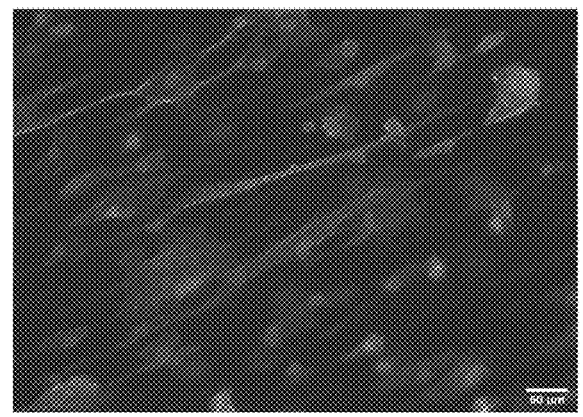
Fig. 4H					Fig. 4I

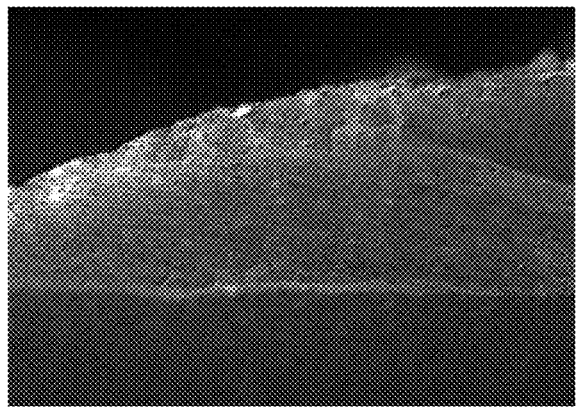
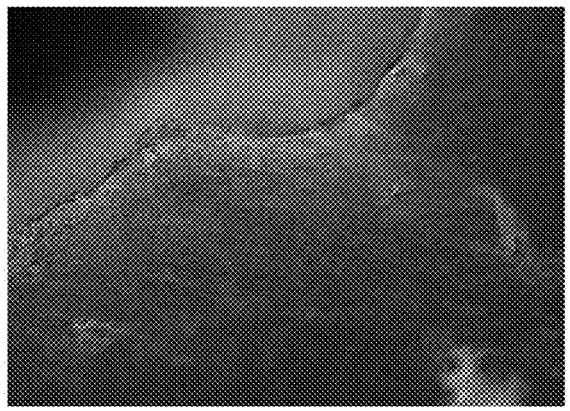
Fig. 5A
Fig. 5B
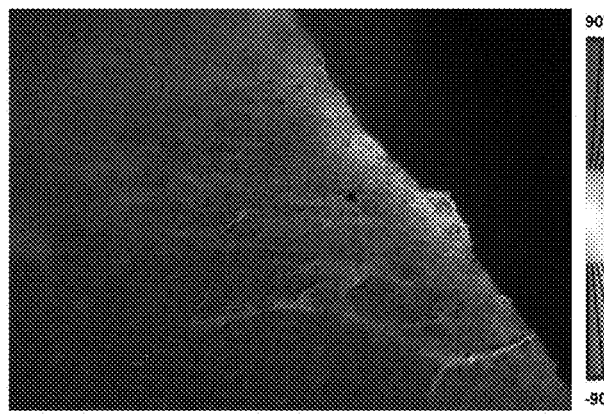
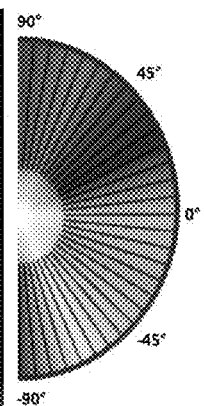
Fig. 5C

NON-DECELLULARIZED PLANT LEAF CULTURES FOR MEAT

RELATED APPLICATION

The present application claims priority to of U.S. provisional application Ser. No. 63/022,758 filed May 11, 2020 entitled, "Non-decellularized plant leaf cultures", by inventors Alex S. Rebello, Jordan Jones and Glenn Gaudette, which is hereby incorporated by reference herein in its entirety.

FIELD OF THE INVENTION

The present invention relates generally to meat alternatives and methods for growing meat alternatives using plant leaves for food production.

BACKGROUND

The future of Earth depends on the exploration of methods to reduce activities that result in destructive environmental changes. Developing a sustainable method of meat production is a challenge facing modern society. The land allocated for the cultivation of grazing livestock is about 26% of Earth's ice-free land. Ellis, E. C. et al., (2010) Global Ecology and Biogeography, 19(5), 589-606. Future projections show that a growing population and demand for meat poses a risk of insufficient land to feed the world by the year 2050 using current methods of livestock cultivation. Aiking, H. (2011) Science & Technology, 22(2-3), 112-120; Ray, D. K. et al., (2013) PloS One, 8(6). The need for land to raise livestock has resulted in deforestation around the world, causing damage to the Amazon rainforest and threatening much of its endemic wildlife. Hasan, A. F et al., (2019) Applied Vegetation Science, 22(3), 394-408. Advocates for eliminating meat from American diets have stressed the need for dietary reformation, however, only 5% of Americans are vegetarian. Shapiro, P. (2018) Clean meat: How growing meat without animals will revolutionize dinner and the world. New York, NY, USA: Simon and Schuster.

Tissue engineering techniques are used to create meat in vitro by expanding cells acquired from small samples of muscle tissue. The tissue engineering process may eliminate some of the need for large livestock herds and has the potential to reduce greenhouse gas emissions and land requirements. Burton, N. M et al., (2000) Methods in Cell Science, 22(1), 51-61.

One of the challenges of tissue engineering is to replicate the structure of traditional meat, such as steaks which requires oxygen diffusion. Due to the limitations of oxygen diffusion, a cell must be within 200 μm of a nutrient source to remain viable. Novosel, E. C et al., (2011) Advanced Drug Delivery Reviews, 63(4), 300-311. In vivo, thick tissues have a complex network of vasculature that provides cells with constant access to oxygen and nutrients. There is currently no definitive tissue engineered solution for vascularized 3D cultures in vitro.

Therefore, there is a need for vascularized 3D cultures for preparing traditional meats, such as steaks. Further, there is a need for vascularized 3D scaffolds which provides oxygen and nutrients to the 3D cultures. There is also a need for in vitro meats which combine nutritional value of plants and meat in a single meat product.

SUMMARY

A method for growing meat alternatives using non-decellularized plant leaves avoids a need to decellularize or lyophilize the plant leaves prior to culturing cells for food production. Plant leaves provide an appropriate cellular structure amenable to cell growth of in vitro meat. In vitro meat is promising because it promotes animal welfare and the preservation of the environment.

An aspect of the invention described herein provides a method for producing an in vitro meat, the method including preparing a non-decellularized plant leaf and incubating the leaf in a cell culture media to obtain a non-decellularized leaf scaffold; seeding the leaf scaffold with a population of muscle cells to obtain a leaf scaffold adhered population of muscle cells; and growing the leaf scaffold adhered population of muscle cells in cell culture media thereby obtaining the in vitro meat.

In an embodiment of the method, preparing the non-decellularized plant leaf further includes at least one step selected from: cleaning the leaf, cutting the leaf, removing cuticle from the leaf, and sterilizing the leaf. In some embodiments of the method, preparing the non-decellularized plant leaf further includes maintaining nutritional value of the plant leaf.

In an embodiment of the method, seeding the non-decellularized leaf scaffold further includes: coating a cell culture plate with a hydrophobic polymer to obtain a polymer coated plate; placing the leaf scaffold on the polymer coated plate; laying a cloning well on the leaf scaffold; depositing the population of muscle cells on the leaf scaffold within the cloning well; and removing non-adherent muscle cells from the leaf scaffold by washing the leaf scaffold with a buffer to obtain the leaf scaffold adhered population of muscle cells.

In an embodiment of the method, the hydrophobic polymer is at least one selected from: agarose, polyethylene glycol silica sol gel (PEG sol), polyhydroxyethylmethacrylate (pHEMA), and polydimethylsiloxane (PDMS). In some embodiments of the method, growing the leaf scaffold adhered population of muscle cells further includes differentiating the leaf scaffold adhered population of muscle cells in a differentiation media.

An embodiment of the method further includes prior to growing, layering a first leaf scaffold adhered population of muscle cells on a second leaf scaffold adhered population of muscle cells. In an embodiment of the method, growing the muscle cells further includes developing a muscle tissue layer on the leaf scaffold.

An embodiment of the method further includes, assembling a plurality of the muscle tissue layers on a plurality of the leaf scaffolds, thereby obtaining a meat product containing alternating muscle tissue layers and leaf scaffolds. An embodiment of the method further includes, growing the meat product containing alternating muscle tissue layers and leaf scaffolds.

In an embodiment of the method, the non-decellularized plant leaf is at least one selected from baby spinach, leek, iceberg lettuce, kale, collard greens, cabbage, beet greens, carrot greens, watercress, romaine lettuce, swiss chard, arugula, dandelion greens, endive, bok choy, turnip greens, mustard greens, and fennel. In an embodiment of the method, the population of muscle cells is sourced from at least one organism selected from: cow, pig, chicken, fish, deer, goat, sheep, rabbit, turkey, duck, alpaca, pheasant, goose, fowl, bison, antelope, and ostrich. In an embodiment of the method, the population of muscle cells are bovine cells.

In an embodiment of the method, the bovine cells are at least one selected from: P9 isolated myosatellite cells, and P12 isolated myosatellite cells. An embodiment of the method further includes after growing, measuring a kappa value for alignment of the leaf scaffold adhered population of muscle cells. In an embodiment of the method, the kappa value is at least one selected from: from about 0.2 to about 0.3, from about 0.3 to about 0.4, from about 0.4 to about 0.5, from about 0.5 to about 0.6, from about 0.6 to about 0.7, from about 0.7 to about 0.8, from about 0.8 to about 0.9, and from about 0.9 to about 1.0. In an embodiment of the method, the method is performed with aseptic technique under aseptic conditions.

An aspect of the invention described herein provides an in vitro produced meat including: an adherent population of muscle cells grown on at least one non-decellularized plant leaf scaffold. In an embodiment of the method, the non-decellularized plant leaf scaffold is selected from: leek leaves, spinach leaves, and lettuce leaves.

An aspect of the invention described herein provides a method for producing an in vitro meat, the method including: selecting at least one non-decellularized plant leaf from: leek, spinach, and lettuce; cleaning, cutting, sterilizing, and incubating the leaf in a cell culture media to obtain a non-decellularized leaf scaffold; placing the leaf scaffold on a PDMS coated plate, and laying a cloning well on the leaf scaffold; seeding a population of muscle cells on the leaf scaffold within the cloning well, and removing non-adherent muscle cells from the leaf scaffold by washing the leaf scaffold with a buffer to obtain a leaf scaffold adhered population of muscle cells; and growing the leaf scaffold adhered population of muscle cells in cell culture media thereby obtaining the in vitro meat.

While the system and methods defined herein have been particularly shown and described with references to embodiments thereof, it will be understood by those skilled in the art that various changes in form and details may be made therein without departing from the scope of the invention encompassed by the appended claims.

BRIEF DESCRIPTION OF DRAWINGS

FIG. 2A-FIG. 2J are a set of microphotographs of fluorescence-stained cells adhered to non-decellularized spinach leaves. Non-decellularized spinach scaffolds sterilized in ethanol were placed in a culture plate, the scaffolds were seeded with P9 isolated myosatellite cells at a seeding density of approximately 300,000 cells per leaf and the cells were incubated with the scaffold in growth media for approximately 48 hours. A negative control having only the non-decellularized spinach scaffold was maintained in growth media. The culture plates and the negative control plates were stained with phalloidin for alpha actinin cytoskeleton protein and Hoechst for nuclei. The myosatellite cells were observed to be adhered to non-decellularized spinach and demonstrated excellent confluence from about 90% to about 100%. FIG. 2A is a microphotograph of the culture plate at four times magnification showing vibrant staining for phalloidin and Hoechst. The wells demonstrate good confluence and seeding technique. FIG. 2B is a microphotograph of the negative control plate showing no stain in any of the plant cells. Therefore, the stained cells are the myosatellite cells and not plant cells contained within the scaffold. FIG. 2C-FIG. 2E are microphotographs of the culture plate at five times magnification. FIG. 2F-FIG. 2J are microphotographs of the culture plate at 10 times magnification.

FIG. 3A-FIG. 3E are a set of microphotographs showing alignment of myosatellite cells adhered on non-decellularized spinach leaves. ImageJ was used to generate a color survey of each image to visualize the orientation of each microfilament. The angle distribution of both, the nuclei and the cytoskeleton were obtained from the color survey. The directional data from the images were imported into MATLAB (MathWorks, Natick, MA, USA) and processed using the CircStat toolbox. The circstat toolbox was used to calculate the mean vector length, angular standard deviation, and the kappa of the distribution. Alignment was measured for the cell nuclei and cytoskeletons independently. The average kappa value of each image was used to represent the overall alignment percentage of that sample. The kappa value for FIG. 3A was observed to be 0.4460, for FIG. 3B the kappa value was observed to be 0.1735, for FIG. 3C the kappa value was observed to be 0.2478, for FIG. 3D the kappa value was observed to be 0.2921, and for FIG. 3E the kappa value was observed to be 0.3152.

FIG. 4A-FIG. 4I are a set of microphotographs of fluorescence-stained cells adhered to non-decellularized leek leaves. Non-decellularized leek scaffolds were sterilized in ethanol and placed in culture plates, the scaffolds were seeded with P9 isolated myosatellite cells at a seeding density of approximately 300,000 cells per leaf and the cells were incubated with the scaffold in growth media for approximately 48 hours. A negative control having only the non-decellularized leek scaffold was maintained in growth media. The culture plates and the negative control plates were stained with phalloidin for alpha actinin cytoskeleton protein and Hoechst for nuclei. The myosatellite cells were observed to be adhered to non-decellularized leek and demonstrated confluence. FIG. 4A is a microphotograph of the culture plate at five times magnification showing vibrant staining for phalloidin and Hoechst. The wells demonstrate good confluence and seeding technique. FIG. 4B is a microphotograph of the negative control plate which displayed a mild phalloidin stain, most likely from the stomata of the leek. The myosatellite cells were observed to adhere to non-decellularized leek leaves. Confluence varied greatly between the images, however the cells were observed to be attached to the strands of the leek, driving their alignment. FIG. 4C-FIG. 4F are microphotographs of the culture plate at 10 times magnification. FIG. 4G-FIG. 4I are microphotographs of the culture plate at 20 times magnification.

FIG. 5A-FIG. 5C are a set of microphotographs showing alignment of myosatellite cells adhered on non-decellularized leek leaves. ImageJ was used to generate a color survey of each image to visualize the orientation of each microfilament. The angle distribution of both, the nuclei and the cytoskeleton were obtained from the color survey. The kappa value for FIG. 5A was observed to be 0.390651, for FIG. 5B the kappa value was observed to be 0.33611, and for FIG. 5C the kappa value was observed to be 0.207821.

FIG. 6A is a microphotograph of the culture plate at four times magnification showing vibrant staining for phalloidin and Hoechst. The wells were observed to demonstrate good confluence and seeding technique. FIG. 6B is a microphotograph of the negative control plate showing no stain in any of the plant cells. Therefore, the stained cells are the myosatellite cells and not plant cells contained within the scaffold. FIG. 6C-FIG. 6E are microphotographs of the culture plate at five times magnification. FIG. 6F-FIG. 6J are microphotographs of the culture plate at 10 times magnification.

DETAILED DESCRIPTION

Figure 1:
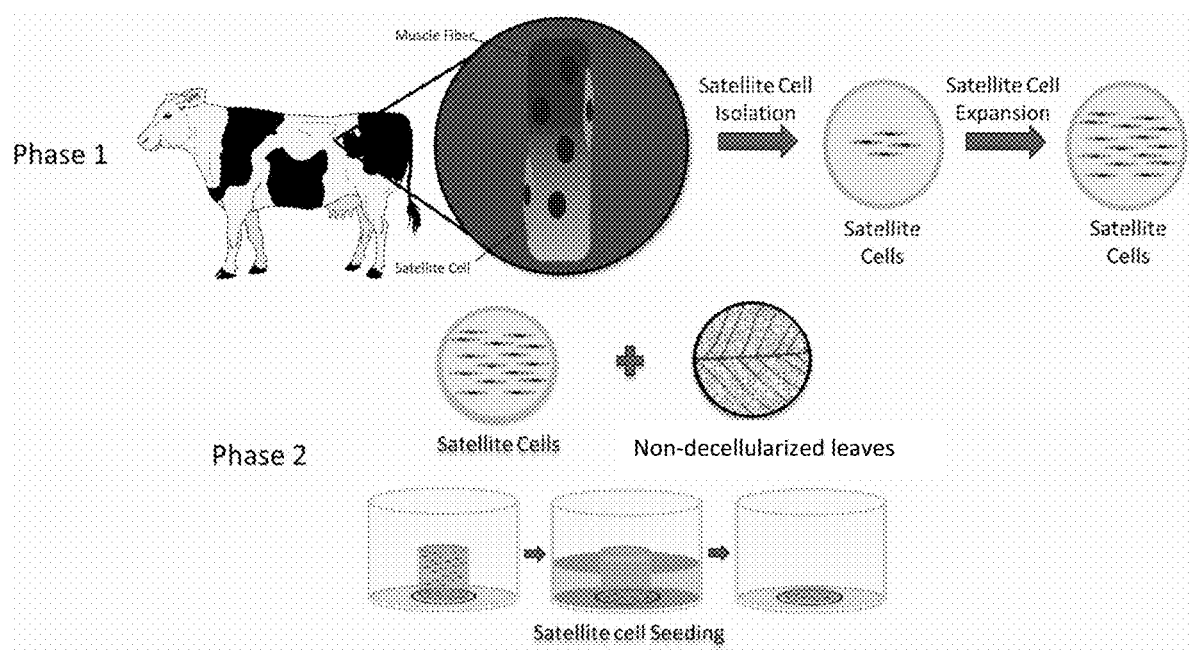
FIG. 1 is a schematic drawing of isolation and seeding of primary bovine satellite cells on non-decellularized leaf scaffold. Tissue samples were acquired from two-year-old Holstein bulls from which satellite cells were isolated and expanded. Cells were cultured on non-decellularized spinach or leek or lettuce scaffolds and differentiated.
Figure 2C:
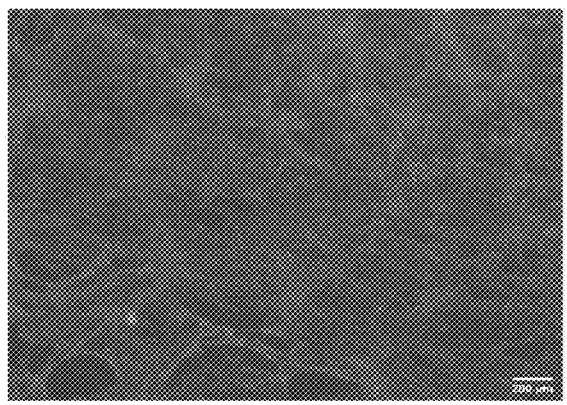
Figure 2D:
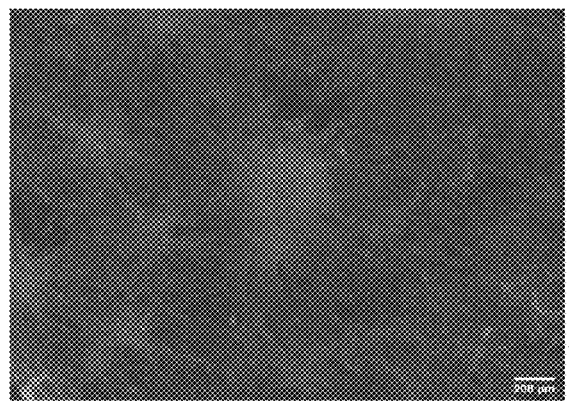
Figure 2E:
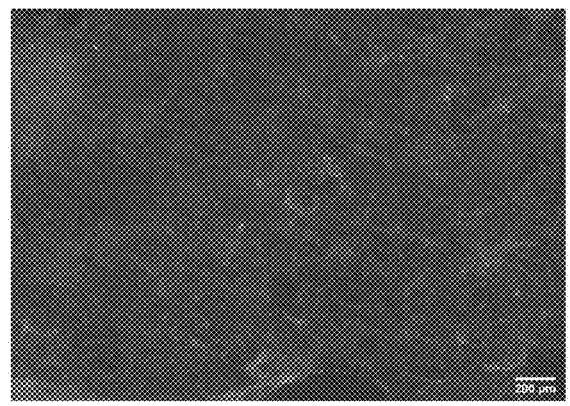
Figure 2F:
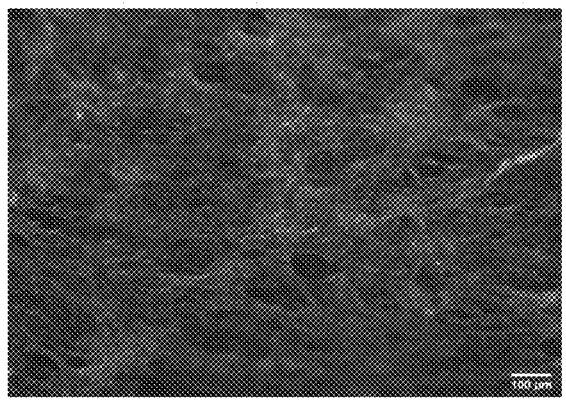
Figure 2G:
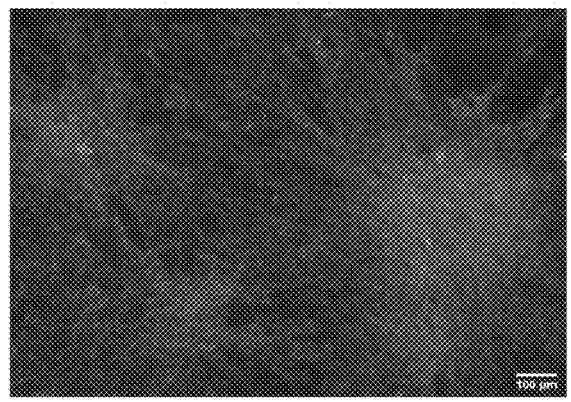
Figure 2H:
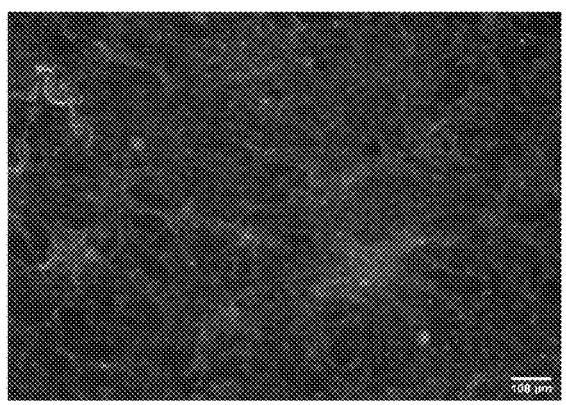
Figure 2I:
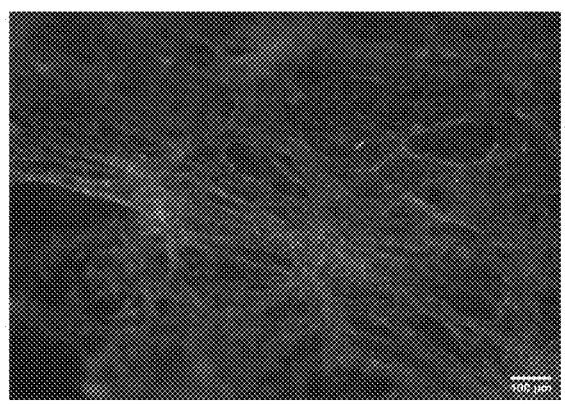
Figure 2J:
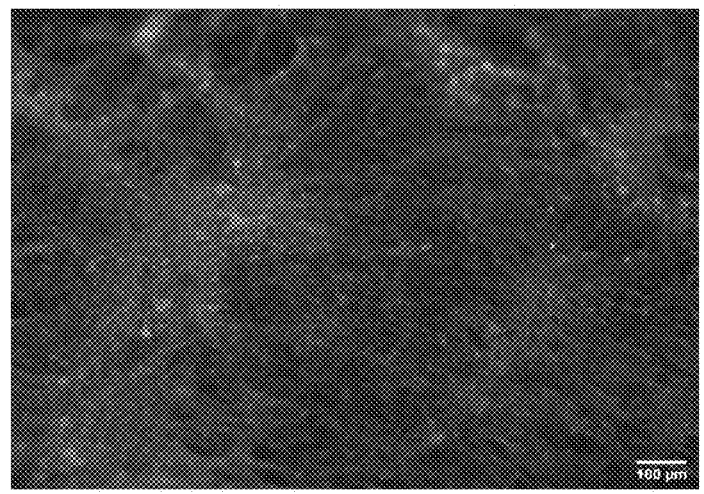
Figure 4C:
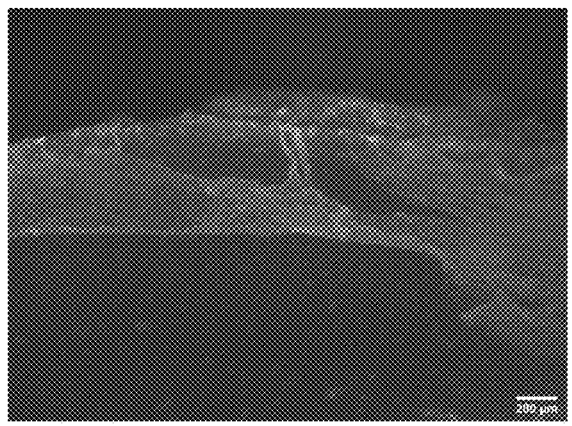
Figure 4D:
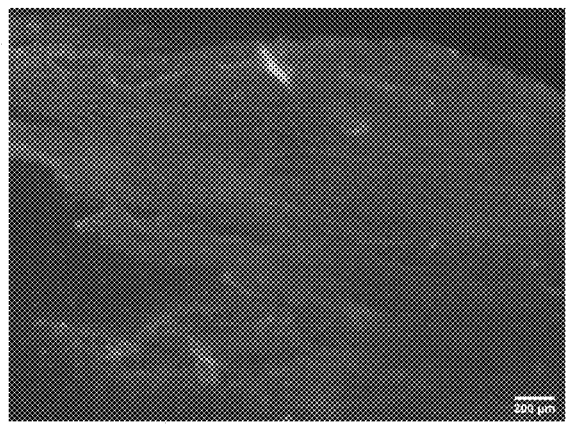
Figure 4E:
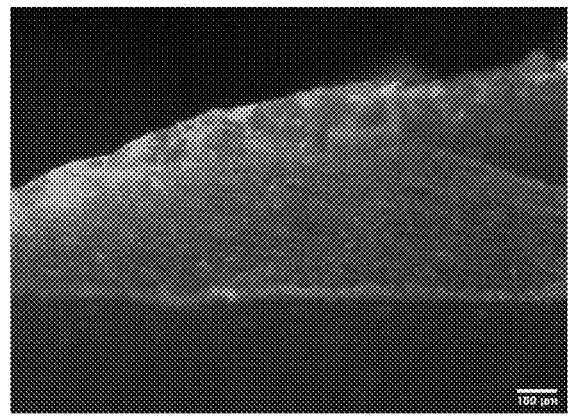
Figure 4F:
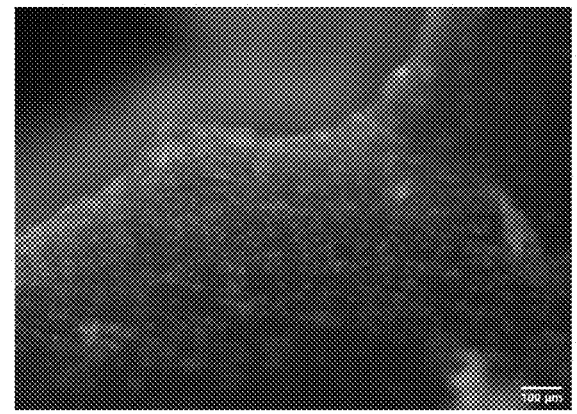
Figure 6A:
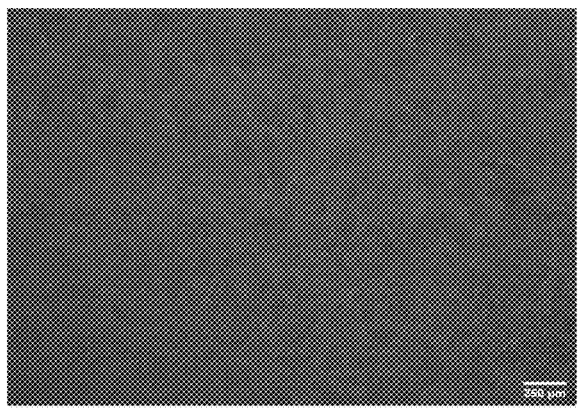
FIG. 6A-FIG. 6J are a set of microphotographs of fluorescence-stained cells adhered to non-decellularized iceberg lettuce leaves. Non-decellularized iceberg lettuce scaffolds were sterilized in ethanol and placed in culture plates, the scaffolds were seeded with P12 isolated myosatellite cells at a seeding density of approximately 200,000 cells per leaf and the cells were incubated with the scaffold in growth media for approximately 48 hours. A negative control having only the non-decellularized lettuce scaffold was maintained in growth media. The culture plates and the negative control plates were stained with phalloidin for alpha actinin cytoskeleton protein and Hoechst for nuclei. The myosatellite cells were observed to be adhered to non-decellularized spinach and demonstrated excellent confluence from about 90% to about 100%.
Figure 6B:
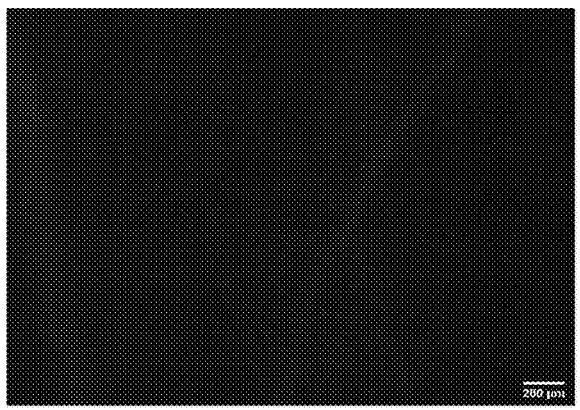
Figure 6C:
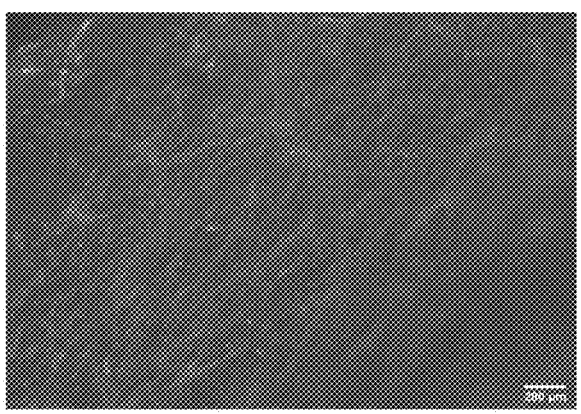
Figure 6D:
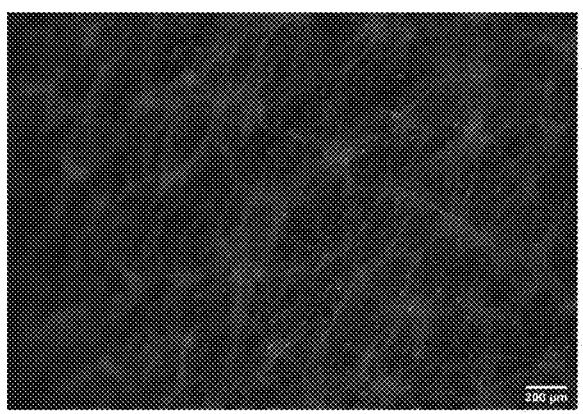
Figure 6E:
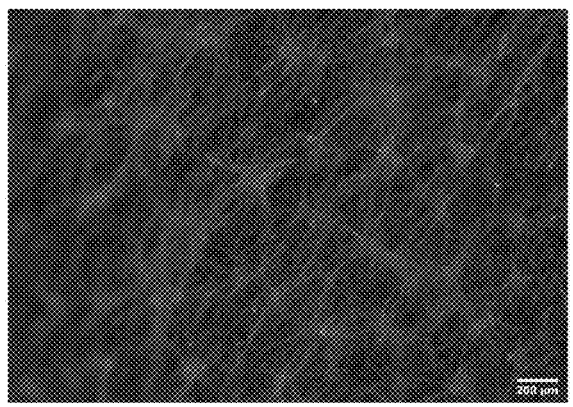
Figure 6F:
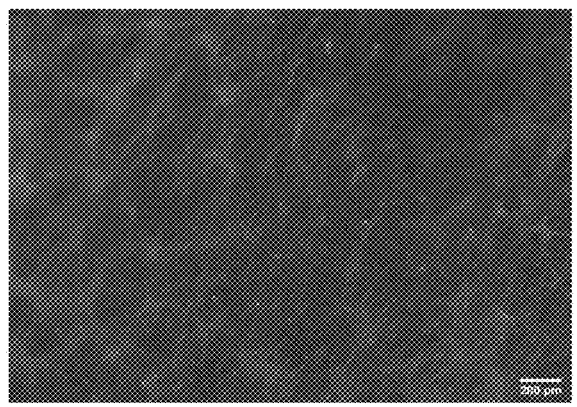
Figure 6G:
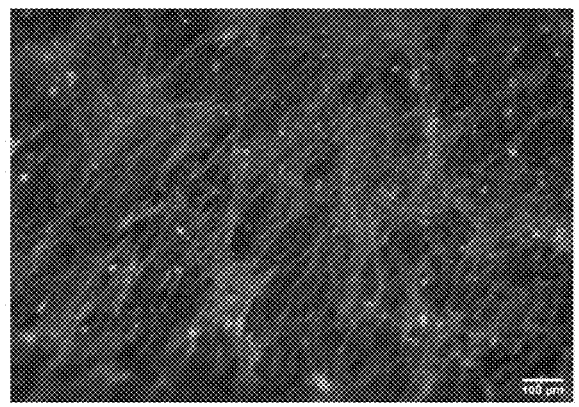
Figure 6H:
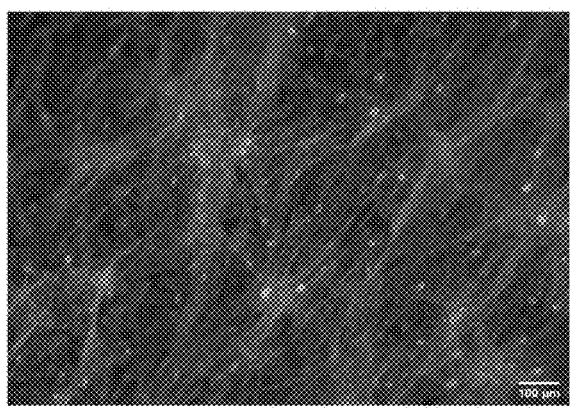
Figure 6I:
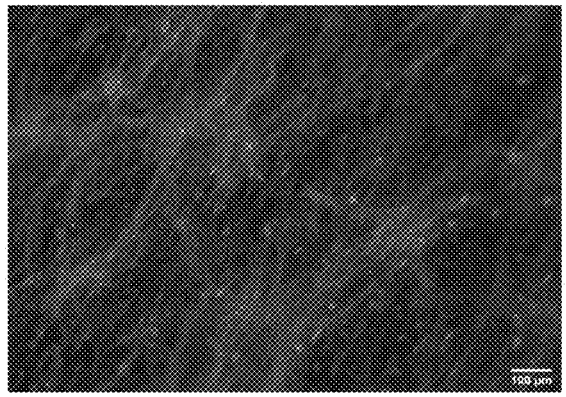
Figure 6J:
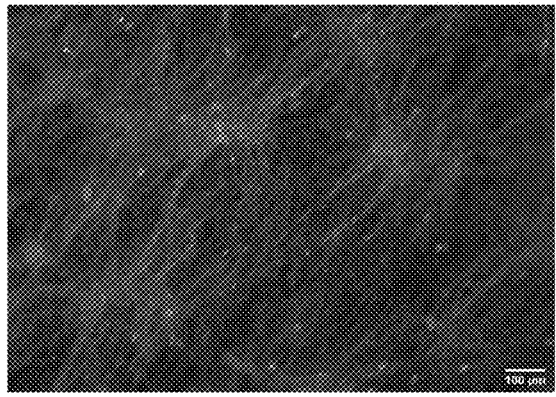
Figure 7A:
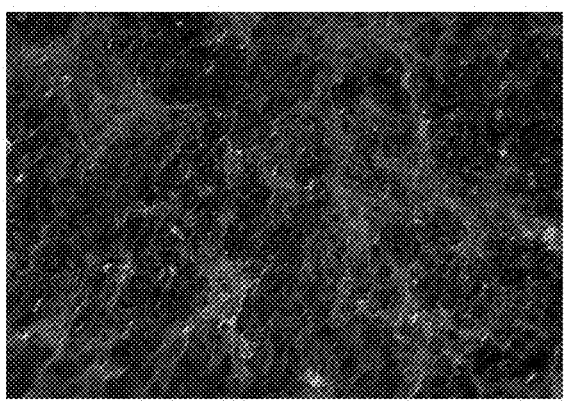
FIG. 7A-FIG. 7D are a set of microphotographs showing alignment of myosatellite cells adhered on non-decellularized iceberg lettuce leaves. ImageJ was used to generate a color survey of each image to visualize the orientation of each microfilament. The angle distribution of both, the nuclei and the cytoskeleton were obtained from the color survey. The kappa value for FIG. 7A was observed to be 0.2760, for FIG. 7B the kappa value was observed to be 0.2858, for FIG. 7C the kappa value was observed to be 0.2979, and for FIG. 7D the kappa value was observed to be 0.3445.
Figure 7B:
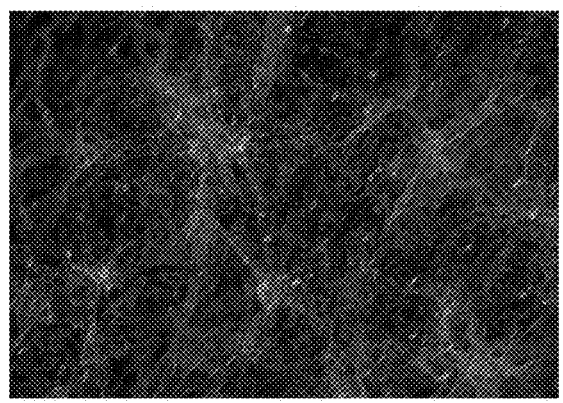
Figure 7C:
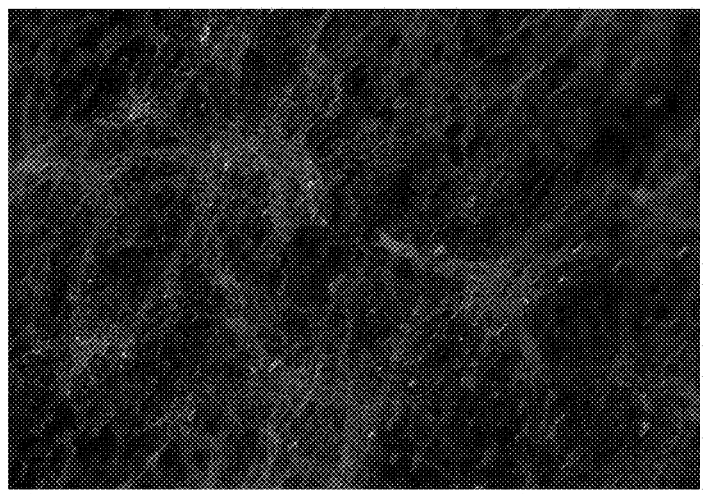
Figure 7D:
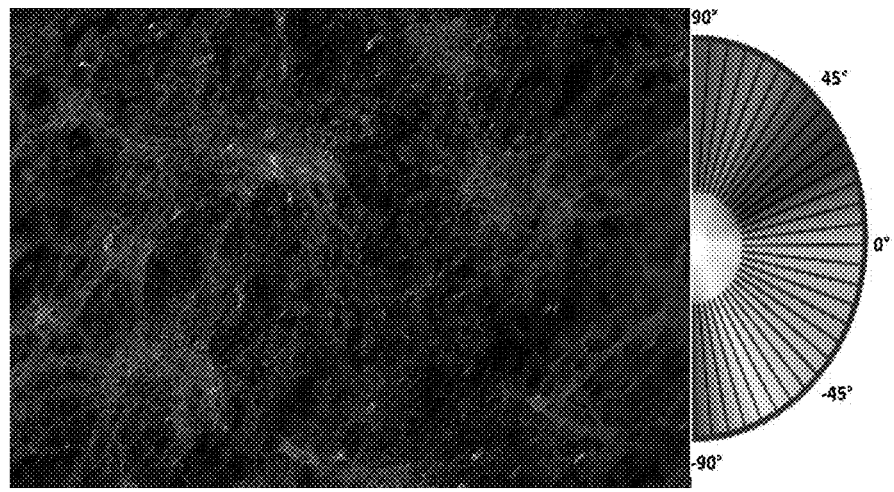

The examples described herein demonstrate sterilized, noncoated, non-decellularized plant leaves seeded with isolated bovine myoblasts for 48 hours. The scaffolds were also assessed for alignment according to the Kappa statistic. Each of the scaffolds were observed to successfully adhere to myoblasts and demonstrate alignment. The myoblasts were observed to be adhered to the scaffolds and having approximate Kappa values of 0.3, indicating similar alignment among the groups.

During isolation, it is important to maximize the number of myoblasts and myosatellite cells because myoblasts and myosatellite cells differentiate into myocytes during their lineage. The goal of any lab-grown meat product is to have lots of myocytes because they provide muscle structure, striation, and contractility.

Non-decellularized plant leaves offer numerous advantages as a scaffold for cultured meat production compared to decellularized plant leaves. Non-decellularized plant leaves, incorporated into the final meat product are more likely to be accepted by consumers because the nutritional value of the leaf is incorporated into the cultured meat. Further, the leaves provide additional nutritional content of fiber which is lacking in non-cultured meat. Decellularization process requires washing the leaves with detergent therefore, decellularized leaves may retain traces of detergent in the cultured meat. By eliminating the additional steps of decellularizing plant leaves, the overall process of growing meat is simplified, the possibility of trace quantities of detergent on the decellularized leaves is eliminated thereby saving time, money, and instilling confidence in consumers.

Myoblasts refers to cells which are precursor cells to muscle fibers. During the process of myogenesis, myoblasts fuse to form long, tubular cells called myocytes. Myogenesis occurs when growth factors are removed from the culture media or when myoblasts come into contact with each other. Myoblasts tend to float in the media and to adhere to laminin-coated surfaces.

Myosatellite cells are precursor cells to myoblasts. They differentiate into myoblasts when growth factors are removed from the culture media. Myosatellite cells tend to float in the media and adhere to laminin-coated surfaces.

The term nutritional value or nutritional content refers to contents of the meat and the leaves and the impact of the constituents on body. It relates to amounts of carbohydrates, fats, proteins, minerals, additives, enzymes, vitamins, sugar intake, cholesterol, fat and salt.

An embodiment of the present invention involves a method for producing meat products that may be used for consumption. The method includes culturing muscle stem cells in vitro and allowing these cells to differentiate into specific types of muscle cells such as skeletal muscle cells or smooth muscle cells ex vivo. Muscle cells are derived from any non-human animals consumed by humans such as mammals (e.g. cattle, buffalo, pigs, sheep, deer, etc.), birds (e.g. chicken, ducks, ostrich, turkey, pheasant, etc.), fish (e.g. swordfish, salmon, tuna, sea bass, trout, catfish, etc.), invertebrates (e.g. lobster, crab, shrimp, clams, oysters, mussels, sea urchin, etc.), reptiles (e.g. snake, alligator, turtle, etc.), and amphibians (e.g. frog legs). The muscle cells are derived from pluri-potent embryonic mesenchymal stem cells that give rise to muscle cells, fat cells, bone cells, and cartilage cells. The muscle cells are also be derived from toti-potent embryonic stem cells such as cells from the blastocyst stage, fertilized eggs, placenta, or umbilical cords of these animals.

Muscle cells are grown in culture into muscle tissues that attach to a support structure such as a non-decellularized leaf scaffold or a non-decellularized leaf support structure. In an embodiment, muscle cells are cultured into a muscle tissue of desired thickness having layers of cells adhered to a non-decellularized leaf scaffold. In an embodiment muscle cells are cultured on a first non-decellularized leaf scaffold into a first muscle tissue, then a second non-decellularized leaf scaffold is placed on the first muscle tissue and a second muscle tissue is cultured on the non-decellularized second leaf scaffold. In some embodiments, a meat product contains a plurality of muscle tissue layers grown on non-decellularized leaf scaffold layers. In some embodiments, two-dimensional support structure such as a culture plate with a non-decellularized leaf scaffold forms several layers of cells that are peeled and processed for consumption. Other examples of two-dimensional support structures include porous membranes that allow for diffusion of nutrients from culture media on one side of the membrane to the other side where the cells are attached. In this type of culture conditions, additional layers of cells may be achieved by exposing the cells to culture media from both sides of the membrane, i.e., cells received nutrients through diffusion from one side of the membrane and from the culture media covering the cells growing on the membrane.

Muscle cells are grown on, around, or inside a three-dimensional support structure having a non-decellularized leaf scaffold. The support structures are sculpted into different sizes, shapes, and forms, as desired, to provide the shape and form for the muscle cells to grow and resemble different types of muscle tissues such as steak, tenderloin, shank, chicken breast, drumstick, lamb chops, fish fillet, lobster tail, etc. A three-dimensional non-decellularized leaf scaffold support structure is molded to include a branched vascular network providing for delivery of nutrients into and shuttling out of metabolites from the cells at the inner mass of the meat product.

The culture conditions for the muscle cells include static, stirred, or dynamic flow conditions. For scaled up production, a bioreactor is used which produces greater volume of cells and allows greater control over the flow of nutrients, gases, metabolites, and regulatory molecules. Furthermore, bioreactors may provide physical and mechanical signals such as compression to stimulate cells to produce specific biomolecules. Vacanti, J., et. al., Tissue Engineering: The Design and Fabrication of Living Replacement Devices for Surgical Reconstruction and Transplantation, Lancet, 354 Suppl. 1, p S132-34 (1999). This reference is hereby incorporated by reference herein in its entirety.

In another embodiment of the invention, meat products derived from muscle cells grown ex vivo includes fat cells derived from any non-human animals. Fattier meat is generally tastier, but with greater fat content comes greater risk of adverse health consequences such as heart disease. Thus, the ratio of muscle cells to fat cells may be regulated in vitro to produce the meat products with optimal flavor and health effects. Regulation is achieved by controlling the ratio of muscle and fat cells that are initially seeded in culture and/or by varying, as desired, the concentrations and ratio of growth factors or differentiation factors that act upon the muscle cells or fat cells.

In an embodiment of the invention, cartilage derived from chondrocytes forms an underlying support layer or structure together with the non-decellularized leaf scaffold. Afterwards, muscle cells or fat cells, or both, are seeded onto the chondrocyte layer. The interaction of muscle cells and chondrocytes further provides the necessary regulatory signals required for tissue formation. Examples of meat products that have muscle cells and cartilage cells include chicken breast or pork ribs.

In an embodiment of the invention, aseptic techniques are used to culture the muscle cells resulting in meat products that are substantially free from harmful microbes such as bacteria, fungi, viruses, prions, protozoa, or any combination of the above. Harmful microbes include pathogenic type microorganisms such as *Salmonella, Campylobacter, E. coli*—0156:H7, etc. In addition, muscle cells grown in culture are substantially free from parasites such as tapeworms that infect muscles of whole animals and that are transferred to humans through consumption of insufficiently cooked meat. Aseptic techniques are employed in packaging the meat products as they come off the biological production line. Such quality assurance are monitored by standard assays for microorganisms or chemicals that are already known in the art. "Substantially free" means that the concentration of microbes or parasites is below a clinically significant level of contamination, i.e., below a level in which ingestion would lead to disease or adverse health conditions.

In an embodiment of the invention, the meat product derived from muscle cells grown are exposed to an electric or oscillating current. Unlike muscle tissues derived from whole animals, muscle tissues grown ex vivo or in vitro may have never been exercised (e.g., never been used to move a leg). Thus, exposing the muscle cells, muscle tissue, or the meat products in vitro to an electric or oscillating current mimics exercise and increases the similarity in texture between meat grown ex vivo and meat derived from whole animals. The electric or oscillating current also increases the growth rate of muscle cells ex vivo. The electric or oscillating current is applied to the muscle stem cells or to the muscle cells after they have differentiated from the stem cells.

In an embodiment of the invention, other nutrients such as vitamins that are normally lacking in meat products from whole animals may be added to increase the nutritional value of the meat. The nutritional value is increased either through straight addition of the nutrients to the growth medium or through genetic engineering techniques. For example, the gene or genes for enzymes responsible for the biosynthesis of a particular vitamin, such as Vitamin D, A, or the different Vitamin B complexes, are transfected in the cultured muscle cells to produce the particular vitamin.

In an embodiment of the invention, regulatory factors, growth factors, or other gene products are genetically introduced into the muscle cells. These factors, known as myogenic regulatory factors ("MRFs"), stimulate and regulate the growth of muscles in vivo, and are normally produced by muscle cells in vivo or in vitro. Thus, expressing myogenic regulatory factors in cultured muscle cells increase the production of muscle cells in vitro.

In some embodiments of the invention, the meat products derived from muscle cells in vitro include different derivatives of meat products. These derivatives are prepared, for example, by grounding or shredding the muscle tissues grown in vitro and mixed with appropriate seasoning to make meatballs, fish balls, hamburger patties, etc. The derivatives are prepared from layers of muscle cells cut and spiced into, for example, beef jerky, ham, bologna, salami, etc. Thus, the meat products of the present invention are used to generate any kind of food product originating from the meat of an animal.

The data and examples described herein demonstrate the efficacy of non-decellularized plant leaves in culturing bovine muscle cells. In some embodiments, the non-decellularized plant scaffolds were sterilized in ethanol before seeding with bovine muscle cells. In some embodiments, adherent protein coatings were not used on any of the scaffolds. In some embodiments, the non-decellularized plant leaves used as a tissue engineering scaffold include baby spinach, leek, iceberg lettuce, kale, collard greens, cabbage, beet greens, carrot greens, watercress, romaine lettuce, swiss chard, arugula, dandelion greens, endive, bok choy, turnip greens, mustard greens, and fennel.

The plant leaves are generally decellularized before they are seeded with muscle cells because decellularization removes all cells, DNA, and plant material from the leaf which negatively affects muscle cell adhesion and function. The examples described herein demonstrate that plant leaves are not required to be decellularized and are beneficial for the process of developing cultured meat. The decellularization process is an additional step which requires additional materials and equipment. Therefore, non-decellularization saves time and resources. The non-decellularized leaves retain the nutritional value of the leaf therefore, the in vitro meat product contains nutritional value of the meat and of the leaves. Decellularized plant leaves are structurally poor and difficult to handle compared to their non-decellularized plant leaves.

The invention now having been fully described, is further exemplified by the following examples and claims. Those skilled in the art will recognize or be able to ascertain using no more than routine experimentation, numerous equivalents to the specific procedures described herein. Such equivalents are within the scope of the present invention and claims. The contents of all references including issued patents and published patent applications cited in this application are hereby incorporated by reference in their entirety.

The examples described herein measured viability, differentiation, and alignment. The examples were performed with three biological replicates with cells isolated from three different live cows (2-yr-old male Holsteins raised for meat without growth stimulants) grown on non-decellularized leaves such as spinach, leek and lettuce. The biological replicates were referred to as cow 1, cow 2, and cow 3. The three animals used were sourced from a local slaughter facility (Adams Farm, Athol, MA, USA) and slaughtered using electrical stunning. Tissue samples were collected from the shank area of the front legs. Each biological replicate had three technical replicates for a total sample size of 9. Each example was completed at two time points: 7 and 14 days. At the end of each time point, the samples were fixed in 4% paraformaldehyde for 10 minutes.

Example 1: Imaging and Analysis

Sample images were obtained by using a Leica SP5 point scanning confocal microscope (Leica Microsystems, Wetzlar, Germany) at various magnifications. Five images were taken from each sample. One image was taken from the center of the scaffold and from four images were taken from locations around the edges of the seeded area.

Example 2: Statistical Analysis

All statistical analysis was performed using GraphPad Prism 9.0.0_121 (Graphpad, San Diego, CA, USA). Unless specified otherwise, the data are expressed as mean±standard deviation. The comparisons were made with either an ordinary one-way ANOVA or Welch's t-test. A p value of <0.05 was used as the threshold of statistical significance.

Example 3: Spinach Leaf Scaffold Preparation

Triple washed packaged baby spinach leaves (Olivia's Organics, Chelsea, MA, USA) were acquired from a local food store. Spinach cuticles were removed by agitating the leaves in 98% hexane (VWR, Radnor, PA, USA) for 3 min followed by washing the leaves with phosphate buffered saline (PBS) (137 mM NaCl, 112.7 mM KCl, 10 mM Na2HPO4, 1.8 mM KH2PO4 in deionized water) for 3 minutes. The deionized water used in all solutions was generated using the Ultrapure Direct-Q water system (MilliporeSigma, Burlington, MA, USA). Cuticle removal was achieved after three cycles of hexanes and PBS treatment.

Example 4: Primary Satellite Cell Isolation

The muscle samples were kept in separate containers on ice for 30 minutes during transportation from the slaughter facility to the laboratory. Satellite cell isolation was commenced immediately upon arrival (FIG. 1). The entire isolation was completed inside a laminar flow hood. Prior to isolation the instruments and dishes were sterilized in a Tuttnauer EZ9-PLUS Steam Sterilizer (Tuttnauer NY, Huappauge, NY, USA). The muscle tissue was placed onto a sterile dish and soaked in rinse medium (Ham's Dulbecco's modified Eagle's medium (DMEM/F12) (Thermo Fisher Scientific), 1% each of penicillin/streptomycin (P/S) (Thermo Fisher Scientific) for 10 minutes. The inner tissue was exposed by making a shallow horizontal cut through the center of the muscle. The muscle tissue on either side of this cut was excised away with a set of sterile tools and samples were obtained from the exposed interior muscle and dissected into three pieces of about 1 mm each. The samples were then placed in a sterile dish containing digestion medium (Ham's DMEM/F12, 1% P/S, 10% recombinant collagenase sourced from *Clostridium histolyticum* (Worthington, Lakewood, NJ, USA) and incubated at 37° C. for 1 hour. The dish was swirled every 15 min. The content of the dish was transferred to a 50 ml conical tube and allowed to settle to the bottom. The supernatant was removed and filtered using a 100 μm sterile cell strainer (VWR) into a 50 ml conical tube and centrifuged at 300×g at room temperature for 5 minutes. The tissue pellet was resuspended in 25 ml of sterile rinse medium (Ham's DMEM/F12, 1% P/S). Filtration was completed using three 70 μm and three 40 μm cell strainers (Thermo Fisher Scientific), centrifuging as stated above, and resuspending the pellet after each filtration. After the final filtration, the pellet was resuspended in 12 ml of growth medium (Ham's DMEM/F12, 10% heat-inactivated fetal bovine serum (FBS) Thermo Fisher Scientific, 1% P/S, 4 ng/ml recombinant human fibroblast growth factor—2 (FGF2), 2.5 ng/ml recombinant human hepatocyte growth factor (HGF), 10 ng/ml recombinant human epidermal growth factor (EGF), and 5 ng/ml recombinant human insulin-like growth factor—1 (IGF)). The isolated cells were incubated overnight at 37° C. and 5% CO2 with a HERAcell 150i CO2 incubator (Thermo Fisher Scientific) to allow cell attachment. Due to the inherent heterogeneity of the isolated population, it was necessary to enrich the population of satellite cells. Therefore, to enrich the population of satellite cells, the cell suspension was plated on non-tissue culture polystyrene Petri dishes (Thermo Fisher Scientific) and incubated at 37° C. and 5% CO2 for 30 minutes to remove unwanted cells from the population prior to subculturing.

Example 5: Non-Decellularized Scaffold Preparation

A 12 mm diameter circular punch was used to create scaffolds of uniform size. Scaffolds were then rehydrated using 10 mM tris buffer pH adjusted to 9.0 for 15 minutes at room temperature. Scaffolds were sterilized by incubating them in 70% ethanol for 30 minutes in a sterile dish inside a laminar flow cabinet. After sterilization, scaffolds were rinsed three times with sterile PBS with a 5-minute interval between each rinse. Cell seeding was facilitated in a polydimethylsiloxane (PDMS) (Dow Chemical, Midland, MI, USA) coated polystyrene 12-well plate (Thermo Fisher Scientific). The PDMS was formed by mixing the base elastomer and the curing agent at a ratio of 10:1 and degassed with a Bel-Art benchtop polycarbonate vacuum desiccator (Bel-Art Products, South Wayne, NJ, USA) for 1 hour to remove air bubbles. Approximately 1.5 ml of PDMS was poured into each well of the 12-well plate. The hydrophobic nature of the PDMS is used to prevent the cell suspension from spilling over onto the surface of the well. This also prevents cells from adhering to the surface of the plate. The hydrophobicity ensures that most of the cell suspension remains over the scaffold in the initial seeding period and that non-adhered cells are washed away (FIG. 1). Sterile forceps were used to move each leaf scaffold to a well of the PDMS coated plate. Ten mm diameter (8 mm inner diameter) cloning wells (Corning Life Sciences, Tewksbury, MA, USA) were placed over the scaffolds to further confine the cell suspension to a specific area of the scaffold. The cloning wells remained in place for the duration of cell seeding.

Example 6: Seeding Cells on Non-Decellularized Scaffolds

A 20 μl sample was removed from the cell suspension. A hemocytometer (Hausser Scientific, Horsham, PA, USA) was used to count the number of cells present in the sample and used to estimate the number of cells present in the total cell population. Approximately 200,000 cells were deposited directly onto the surface of the scaffold within the cloning well. After a 24-hour cell seeding period, cells that had not adhered were removed by gently rinsing the surface of the leaf with sterile PBS. The growth media inside the cloning well was replaced, and an additional 1 ml of cell growth media was placed outside of the cloning well to entirely submerge the non-decellularized leaf (FIG. 1).

Example 7: Viability Assessment of Seeded Satellite Cells

After seeding, cells were cultured in growth media. The growth media was replaced every 48 hours. The cells were studied at 7 and 14 days. At the end of each time point, the samples were stained using a LIVE/DEAD® _staining kit (Thermo Fisher Scientific), a fluorescence-based viability stain composed of calcein AM and ethidium homodimer-1 and fixed in 4% paraformaldehyde for 10 min. Calcein AM is a fluorescent dye with an excitation wavelength of 494 nm and an emission wavelength of 517 nm used to label the body of live cells. Ethidium homodimer-1 is a fluorescent dye with an excitation wavelength of 517 nm and an emission wavelength of 617 nm used to label the nucleus of dead cells. Cells incubated in 70% ethanol for 30 minutes were used as a dead control. Samples were also stained with Hoechst 33342 (Thermo Fisher Scientific), a stain for DNA, was used to confirm the presence of a cell nucleus. The viability percentage was calculated using the FIJI-ImageJ 1.8.0_172 (National Institutes of Health (NIH), Rockville, MD, USA) image processing program, downloaded from https://imagej.net/Fiji, to count dead cells and live cells present in each image (Kothari et al., 2009; Schindelin et al., 2012). A cell was considered dead if the ethidium homodimer-1 marker coincided with the nucleus of the cell. Cells lacking the dead marker were considered viable. The average of these images was used to represent the overall viability.

Example 8: Assessment of Differentiation Potential

Cells were maintained in growth media for 2 days. The specimens were then changed to differentiation media containing only 2% heat inactivated FBS with all other components unchanged. Differentiation was measured at 5 and 12 days after exposure to the differentiation media (corresponding to 7 and 14 days after seeding). Specimens were fixed in 4% paraformaldehyde and stained for myosin heavy-chain (MyHC) using MF20 primary antibody (Developmental Studies Hybridoma Bank, Iowa City, IA, USA) and Alexa fluor 488 secondary antibody (Thermo Fisher Scientific). The specimen was stained with Hoechst 33342 to mark the presence of cell nuclei. Differentiation percentage was calculated using FIJI-ImageJ 1.8.0_172 software to count nuclei present in each image. A cell was determined to be differentiated if the nucleus coincided with the fluorescent signal of the secondary antibody of the MyHC antibody. All other nuclei were determined to be non-differentiated cells. The average of these images was used to represent the overall differentiation percentage for that sample.

Example 9: Assessment of Cell Alignment

Alignment was measured at 5 and 12 days after exposure to the differentiation media. At the end of each time point, the specimens were fixed in 4% paraformaldehyde, and stained for F-actin using Phalloidin 488 (Life Technologies, Carlsbad, CA, USA) and Hoechst 33342. Samples were imaged using a Leica SP5 point scanning confocal microscope (Leica Microsystems) at 40×. The alignment was determined by measuring the orientation of the cell nuclei and the cytoskeleton. The orientation of the nuclei was measured using the FIJI-ImageJ 1.8.0_172 image processing program by fitting an ellipse to each nucleus and measuring the angle of the maximum diameter relative to the horizontal axis of the image. The OrientationJ plug-in, downloaded from http://big.www.epfl.ch/demo/orientation/, for FIJI-ImageJ 1.8.0_172 was used to measure the orientation of each microfilament in the image. OrientationJ was also used to generate a color survey of each image to visualize the orientation of each microfilament. The angle distribution of both the nuclei and the cytoskeleton were each obtained from these data. Relative alignment is quantified by comparing the kurtosis, an index of the variability of the distribution of the measured variable, of each distribution to another. However, as directional data was being measured, directional statistics, mean vector angle and kappa, were used to study the distributions. The directional data from these images were imported into MATLAB (MathWorks, Natick, MA, USA) and processed using the CircStat toolbox (Berens, 2009). The circstat toolbox was used to calculate the mean vector length, angular standard deviation, and the kappa of the distribution. Kappa represents the concentration of angle values in the distribution (Dunn & Brown, 1986; Mardia, 1975), with a value that ranges from 0 to 1 (Table 1). A value of 0 indicates a distribution that lacks any discernable alignment, a value of 1 indicates perfect and evident alignment. Alignment was measured for the cell nuclei and cytoskeletons independently. The average kappa value of each image was used to represent the overall alignment percentage of that sample.

TABLE 1

Kappa values and degree of alignment of myosatellite cells

| Kappa value | Degree of alignment |
| --- | --- |
| ≤0 | Poor |
| 0.1-0.20 | Slight alignment |
| 0.21-0.40 | fair alignment |
| 0.41-0.60 | moderate alignment |
| 0.61-0.80 | substantial alignment |
| 0.81-0.99 | near perfect alignment |
| ≥1 | perfect alignment |

Example 10: Culturing Muscle Cells on Non-Decellularized Spinach Scaffold

Store bought, non-decellularized baby spinach was cut to desired shape and size. The leaves were then placed into cell culture plate and incubated with tris buffer solution for 30 minutes on a shaker plate. The tris buffer was aspirated, and the leaves were incubated with Deionized water for 30 minutes on the shaker plate. The deionized water was aspirated, and the leaves and the plate were sterilized by spraying the leaves with 70% ethanol and placing them in a biosafety cabinet for 30 minutes. To completely remove traces of ethanol, the leaves were incubated with phosphate buffered saline (PBS) (137 mM NaCl, 112.7 mM KCl, 10 mM Na2HPO4, 1.8 mM KH2PO4 in deionized water) three times for five minutes intervals. The leaves were then placed inside a sanitized polystyrene container that fit the shapes of the leaves. The leaves were covered with in cell growth media (Ham's DMEM/F12, 10% heat-inactivated fetal bovine serum (FBS) Thermo Fisher Scientific, 1% P/S, 4 ng/ml recombinant human fibroblast growth factor—2 (FGF2), 2.5 ng/ml recombinant human hepatocyte growth factor (HGF), 10 ng/ml recombinant human epidermal growth factor (EGF), and 5 ng/ml recombinant human insulin-like growth factor—1 (IGF) and incubated overnight. Sterilized cloning wells (Corning Life Sciences, Tewksbury, MA, USA) were placed on the leaves in a biosafety cabinet.

P9 bovine muscle cells were passaged and counted to estimate the number of cells present in the total cell population. About 300,000 cells were seeded into each cloning well. 300 ul of growth media was added into each cloning well. A control well having the non-decellularized leaf and 2 mL growth media was maintained as a negative control. The negative control sample was to ensure that the actin staining in muscle cells was only due to presence of actin in muscle cells and not in the leaves. Another control well having the cells was maintained as a second negative control to ensure viability of the cells. After seeding, the plates were incubated for 48 hours. The media was then aspirated, and the wells were washed twice with PBS and fixed with 4% Paraformaldehyde for 10 minutes. The wells were then washed twice with PBS and incubated with Triton-X solution for 10 minutes. The solution was aspirated, and the wells were washed twice with PBS. For staining, the plates were blocked with Bovine serum albumin (BSA) solution for 30 minutes, stained with Phalloidin solution for 30 minutes and washed twice with PBS. Finally, the plates were stained with Hoechst solution for about 3 minutes to about 5 minutes, washed twice with PBS and observed under the microscope. The method for culturing the cells on non-decellularized spinach leaves was performed with aseptic technique under aseptic conditions.

Example 11: Myosatellite Cells Adhere to Non-Decellularized Spinach

Green staining is indicative of alpha actinin cytoskeleton protein (phalloidin) and blue stain is indicative of nuclei (Hoechst). The culture plate seeded with cells was observed to demonstrate good confluence and seeding technique. The negative control did not stain any native plant cells (FIG. 2A-FIG. 2J). The culture plate seeded with cells was observed under 4 times, 5 times and 10 times magnification. For each of these magnifications, the cells were observed to be well-adhered to the non-decellularized spinach with a confluence from about 90% to about 100%.

Example 12: Myosatellite Cells are Aligned on Non-Decellularized Spinach

The alignment of the myosatellite cells adhered to non-decellularized spinach was measured using color survey. ImageJ was used to generate a color survey of each image to visualize the orientation of each microfilament. The angle distribution of both, the nuclei and the cytoskeleton were obtained from the color survey. The directional data from the images were imported into MATLAB (MathWorks, Natick, MA, USA) and processed using the CircStat toolbox. The circstat toolbox was used to calculate the mean vector length, angular standard deviation, and the kappa of the distribution. Alignment was measured for the cell nuclei and cytoskeletons independently. The average kappa value of each image was used to represent the overall alignment percentage of that sample. The kappa value for the culture plates ranged from about 0.1735 to about 0.4460 (FIG. 3A-FIG. 3E). Therefore, the myosatellite cells were observed to be fairly aligned.

Example 13: Culturing Muscle Cells on Non-Decellularized Leek Scaffold

Store bought, non-decellularized leek leaves were cut to desired shape and size. The leaves were then placed into cell culture plate and incubated with tris buffer solution for 30 minutes on a shaker plate. The tris buffer was aspirated, and the leaves were incubated with Deionized water for 30 minutes on the shaker plate. The deionized water was aspirated, and the leaves and the plate were sterilized by spraying the leaves with 70% ethanol and placing them in a biosafety cabinet for 30 minutes. To completely remove traces of ethanol, the leaves were incubated with phosphate buffered saline (PBS) (137 mM NaCl, 112.7 mM KCl, 10 mM $Na_2HPO_4$, 1.8 mM $KH_2PO_4$ in deionized water) three times for five minutes intervals. The leaves were then placed inside a sanitized polystyrene container that fit the shapes of the leaves. The leaves were covered with in cell growth media (Ham's DMEM/F12, 10% heat-inactivated fetal bovine serum (FBS) Thermo Fisher Scientific, 1% P/S, 4 ng/ml recombinant human fibroblast growth factor—2 (FGF2), 2.5 ng/ml recombinant human hepatocyte growth factor (HGF), 10 ng/ml recombinant human epidermal growth factor (EGF), and 5 ng/ml recombinant human insulin-like growth factor—1 (IGF)) and incubated overnight. Sterilized cloning wells (Corning Life Sciences, Tewksbury, MA, USA) were placed on the leaves in a biosafety cabinet.

P9 bovine muscle cells were passaged and counted to estimate the number of cells present in the total cell population. About 300,000 cells were seeded into each cloning well 300 ul of growth media was added into each cloning well. A control well having the non-decellularized leaf and 2 mL growth media was maintained as a negative control. The negative control sample was to ensure that the actin staining in muscle cells was only due to presence of actin in muscle cells and not in the leaves. Another control well having the cells was maintained as a second negative control to ensure viability of the cells. After seeding, the plates were incubated for 48 hours. The media was then aspirated, and the wells were washed twice with PBS and fixed with 4% paraformaldehyde for 10 minutes. The wells were then washed twice with PBS and incubated with Triton-X solution for 10 minutes. The solution was aspirated, and the wells were washed twice with PBS. For staining, the plates were blocked with Bovine serum albumin (BSA) solution for 30 minutes, stained with Phalloidin solution for 30 minutes and washed twice with PBS. Finally, the plates were stained with Hoechst solution for about 3 minutes to about 5 minutes, washed twice with PBS and observed under the microscope. The method for culturing the cells on non-decellularized leek leaves was performed with aseptic technique under aseptic conditions.

Example 14: Myosatellite Cells Adhere to Non-Decellularized Leek Leaves Scaffold Green staining is indicative of alpha actinin cytoskeleton protein (phalloidin) and blue stain is indicative of nuclei (Hoechst). The culture plate seeded with cells was observed to demonstrate good confluence and seeding technique. The negative control plate displayed a mild phalloidin stain, most likely from the stomata of the leek. The myosatellite cells were observed to adhere to non-decellularized leek leaves. Confluence varied greatly between the images (FIG. 4A-FIG. 4I), however the cells were observed to be attached to the strands of the leek, driving their alignment. The culture plate seeded with cells was observed under 5 times, 10 times and 20 times magnification. For each of these magnifications, the cells were observed to be well-adhered to the non-decellularized leek leaves with a confluence from about 90% to about 100%.

Example 15: Myosatellite Cells are Aligned on Non-Decellularized Leek Leaves Scaffold The alignment of the myosatellite cells adhered to non-decellularized leek leaves was measured using color survey. The average kappa value of each image was used to represent the overall alignment percentage of that sample. The kappa value for the culture plates ranged from about 0.207821 to about 0.390615 (FIG. 5A-FIG. 5C). Therefore, the myosatellite cells were attached to the strands of the leek leaves and were observed to be fairly aligned.

Example 16: Culturing Muscle Cells on Non-Decellularized Iceberg Lettuce Leaves Store bought, non-decellularized iceberg lettuce leaves were cut to desired shape and size. The leaves were then placed into cell culture plate and incubated with tris buffer solution for 30 minutes on a shaker plate. The tris buffer was aspirated, and the leaves were incubated with Deionized water for 30 minutes on the shaker plate. The deionized water was aspirated, and the leaves and the plate were sterilized by spraying the leaves with 70% ethanol and placing them in a biosafety cabinet for 30 minutes. To completely remove traces of ethanol, the leaves were incubated with phosphate buffered saline (PBS) (137 mM NaCl, 112.7 mM KCl, 10 mM Na2HPO4, 1.8 mM KH2PO4 in deionized water) three times for five minutes intervals. The leaves were then placed inside a sanitized polystyrene container that fit the shapes of the leaves. The leaves were covered with in cell growth media (Ham's DMEM/F12, 10% heat-inactivated fetal bovine serum (FBS) Thermo Fisher Scientific, 1% P/S, 4 ng/ml recombinant human fibroblast growth factor—2 (FGF2), 2.5 ng/ml recombinant human hepatocyte growth factor (HGF), 10 ng/ml recombinant human epidermal growth factor (EGF), and 5 ng/ml recombinant human insulin-like growth factor—1 (IGF)) and incubated overnight. Sterilized cloning wells (Corning Life Sciences, Tewksbury, MA, USA) were placed on the leaves in a biosafety cabinet.

P12 bovine muscle cells were passaged and counted to estimate the number of cells present in the total cell population. About 200,000 cells were seeded into each cloning well 300 ul of growth media was added into each cloning well. A control well having the non-decellularized leaf and 2 mL growth media was maintained as a negative control. The negative control sample was to ensure that the actin staining in muscle cells was only due to presence of actin in muscle cells and not in the leaves. Another control well having the cells was maintained as a second negative control to ensure viability of the cells. After seeding, the plates were incubated for 48 hours. The media was then aspirated, and the wells were washed twice with PBS and fixed with 4% paraformaldehyde for 10 minutes. The wells were then washed twice with PBS and incubated with Triton-X solution for 10 minutes. The solution was aspirated, and the wells were washed twice with PBS. For staining, the plates were blocked with Bovine serum albumin (BSA) solution for 30 minutes, stained with Phalloidin solution for 30 minutes and washed twice with PBS. Finally, the plates were stained with Hoechst solution for about 3 minutes to about 5 minutes, washed twice with PBS and observed under the microscope. The method for culturing the cells on non-decellularized lettuce leaves was performed with aseptic technique under aseptic conditions.

Example 17: Myosatellite Cells Adhere to Non-Decellularized Lettuce Leaves Scaffold Green staining is indicative of alpha actinin cytoskeleton protein (phalloidin) and blue stain is indicative of nuclei (Hoechst). The culture plate seeded with cells was observed to demonstrate good confluence and seeding technique. The negative control wells were observed to demonstrate Hoechst staining but no phalloidin staining. The Hoechst stain, however, is dim and does not generate as clear a signal as the myosatellite cells. The myosatellite cells were observed to adhere to non-decellularized lettuce leaves (FIG. 6A-FIG. 6J). The culture plate seeded with cells was observed under 4 times, 5 times and 10 times magnification. For each of these magnifications, the cells were observed to be well-adhered to the non-decellularized leek leaves with a confluence from about 90% to about 100%.

Example 18: Myosatellite Cells are Aligned on Non-Decellularized Lettuce Leaves Scaffold The alignment of the myosatellite cells adhered to non-decellularized lettuce leaves was measured using color survey. The average kappa value of each image was used to represent the overall alignment percentage of that sample. The kappa value for the culture plates ranged from about 0.2760 to about 0.3445 (FIG. 7A-FIG. 7D). Therefore, the myosatellite cells were attached to the strands of the iceberg lettuce leaves and were observed to be fairly aligned.

To determine which leaves demonstrated better alignment, each group of leaves had its average Kappa calculated±standard deviation (Table 2).

TABLE 2

| Average and Standard Deviation Kappa Values at 10x Magnification | | | |
| --- | --- | --- | --- |
|  | Non-Decellularized Spinach | Non-Decellularized Iceberg Lettuce | Non-Decellularized Leek |
| Kappa Values | 0.4460 | 0.2760 | 0.3906 |
|  | 0.1735 | 0.2858 | 0.3361 |
|  | 0.2478 | 0.2979 | 0.2078 |
|  | 0.2921 | 0.3445 |  |
|  | 0.3152 |  |  |
| Average ± St. Dev. | 0.2949 ± 0.1002 | 0.3011 ± 0.0303 | 0.3115 ± 0.0938 |
| Conclusion | Fair Alignment | Fair Alignment | Fair Alignment |

Those skilled in the art will recognize or will be able to ascertain many equivalents to the specific embodiments of the invention described herein using no more than routine experimentation. Such equivalents are intended to be encompassed by the following claims. All publications, patents and patent applications mentioned in this specification are herein incorporated by reference into the specification to the same extent as if each individual publication, patent, or patent application was specifically and individually indicated to be incorporated herein by reference in its entireties. Citation or discussion of a reference herein shall not be construed as an admission that such is prior art to the present invention.

What is claimed is:

1. A method for producing an in vitro meat, the method comprising:
   preparing a non-decellularized plant leaf and incubating the leaf in a cell culture media to obtain a non-decellularized leaf scaffold formed from a spinach leaf;
   sterilizing the non-decellularized leaf scaffold with ethanol and a saline rinse;
   forming a population of muscle cells by:
     extracting a bovine tissue sample;
     incubating the sample in a digestion medium to form a tissue pellet;
     suspending the pellet in a growth medium to form satellite cells; and
     enriching the satellite cells by incubating in a carbon dioxide environment for removing unwanted cells to form a cell suspension including the population of muscle cells;
   seeding the non-decellularized leaf scaffold with the population of muscle cells to obtain a leaf scaffold adhered population of muscle cells, seeding further comprising:
     coating a cell culture plate with a hydrophobic polymer to obtain a polymer coated plate, the coating formed from polydimethylsiloxane (PDMS);
     placing the non-decellularized leaf scaffold on the polymer coated plate;
     laying a cloning well on the non-decellularized leaf scaffold;
     depositing the population of muscle cells on the non-decellularized leaf scaffold within the cloning well, the hydrophobic polymer and the cloning well maintaining the population of muscle cells in communication with the non-decellularized leaf scaffold;
   developing a muscle tissue layer on the leaf scaffold;
   assembling a plurality of the muscle tissue layers on the non-decellularized leaf scaffold for exposing the muscle cells to the cell culture media on opposed sides of the muscle tissue layers, further including layering a first leaf scaffold adhered population of muscle cells on a second leaf scaffold for forming an adhered population of muscle cells in a layered three-dimensional support structure of non-decellularized leaf scaffolds;
   removing non-adherent muscle cells from the non-decellularized leaf scaffold by washing the leaf scaffold with a buffer to obtain the leaf scaffold adhered population of muscle cells; and
   growing the leaf scaffold adhered population of muscle cells in cell culture media for differentiating the leaf scaffold adhered population of muscle cells in a differentiation media, and for achieving an alignment of a kappa value of between 0.17 to 0.45 for myosatellite cells defining the population of muscle cells, thereby obtaining the in vitro meat.

2. The method according to claim 1, wherein preparing the non-decellularized plant leaf further comprising at least one step selected from: cleaning the leaf, cutting the leaf and removing cuticle from the leaf.

3. The method according to claim 1, wherein preparing the non-decellularized plant leaf further comprising maintaining nutritional value of the plant leaf.

4. The method according to claim 1 further comprising growing the meat product by alternating muscle tissue layers and leaf scaffolds.

5. The method according to claim 1, wherein the satellite cells are at least one selected from: P9 isolated myosatellite cells, and P12 isolated myosatellite cells.

6. The method according to claim 1 further comprising after growing, measuring a kappa value for alignment of the leaf scaffold adhered population of muscle cells.

7. The method according to claim 1, wherein the method is performed with aseptic technique under aseptic conditions.

8. A method for producing an in vitro meat, the method comprising:
   providing at least one non-decellularized spinach plant leaf for a non-decellularized leaf scaffold;
   cleaning, cutting, sterilizing the non-decellularized leaf scaffold with ethanol and a saline rinse, and incubating the leaf in a cell culture media to obtain a non-decellularized leaf scaffold;
   forming a population of muscle cells by:
     extracting a bovine tissue sample;
     incubating the sample in a digestion medium to form a tissue pellet;
     suspending the pellet in a growth medium to form satellite cells; and
     enriching the satellite cells by incubating in a carbon dioxide environment for removing unwanted cells to form a cell suspension including the population of muscle cells;
   seeding the population of muscle cells on the non-decellularized leaf scaffold within a cloning well, seeding further comprising:
     placing the non-decellularized leaf scaffold on a polydimethylsiloxane (PDMS) coated plate;
     laying the cloning well on the non-decellularized leaf scaffold;
     depositing the population of muscle cells on the non-decellularized leaf scaffold within the cloning well, the cloning well maintaining the population of muscle cells in communication with the non-decellularized leaf scaffold from the hydrophobic PDMS;
   developing a muscle tissue layer on the leaf scaffold;
   assembling a plurality of the muscle tissue layers on the non-decellularized leaf scaffold for exposing the muscle cells to the cell culture media on opposed sides of the muscle tissue layers, further including layering a first leaf scaffold adhered population of muscle cells on a second leaf scaffold for forming an adhered population of muscle cells in a layered three-dimensional support structure of non-decellularized leaf scaffolds;
   removing non-adherent muscle cells from the non-decellularized leaf scaffold by washing the non-decellularized leaf scaffold with a buffer to obtain a leaf scaffold adhered population of muscle cells; and
   growing the leaf scaffold adhered population of muscle cells in cell culture media by differentiating the leaf scaffold adhered population of muscle cells in a differentiation media, for achieving an alignment of a kappa value of between 0.17 to 0.45 for myosatellite cells defining the population of muscle cells, thereby obtaining the in vitro meat.

9. The method of claim 1 wherein the differentiation media includes 2% or less heat inactivated fetal bovine serum.

10. The method of claim 1 further comprising spraying the non-decellularized leaf scaffold with 70% ethanol and placing them in a biosafety cabinet for between 20-40 minutes.

11. The method of claim 1, wherein the three-dimensional non-decellularized leaf scaffold support structure includes a branched vascular network providing for delivery of nutrients to the muscle cells.

* * * * *